United States Patent
Zhang (10) Patent No.: US 12,457,443 B2
(45) Date of Patent: Oct. 28, 2025

(54) HEADSET DEVICE AND CONTROL METHOD THEREOF

(71) Applicant: Merry Electronics (Shenzhen) Co., Ltd., ShenZhen (CN)

(72) Inventor: Jie Zhang, Sandong (CN)

(73) Assignee: Merry Electronics (Shenzhen) Co., Ltd., ShenZhen (CN)

( * ) Notice: Subject to any disclaimer, the term of this patent is extended or adjusted under 35 U.S.C. 154(b) by 369 days.

(21) Appl. No.: 18/193,650

(22) Filed: Mar. 31, 2023

(65) Prior Publication Data

US 2024/0334111 A1   Oct. 3, 2024

(51) Int. Cl.
*H04R 1/10* (2006.01)
*G01L 1/22* (2006.01)

(52) U.S. Cl.
CPC ............ *H04R 1/1041* (2013.01); *G01L 1/225* (2013.01); *H04R 1/1008* (2013.01)

(58) Field of Classification Search
CPC ...... H04R 1/1041; H04R 1/1008; G01L 1/225
See application file for complete search history.

(56) References Cited

U.S. PATENT DOCUMENTS

| | | | |
|---|---|---|---|
| 10,354,651 B1 * | 7/2019 | Yi | G06F 3/167 |
| 2016/0198251 A1 * | 7/2016 | Pan | H04R 1/1041 381/74 |
| 2018/0078208 A1 * | 3/2018 | Laugstøl | A61B 5/0004 |
| 2020/0113520 A1 * | 4/2020 | Abdul-Hafiz | A61B 5/6843 |
| 2021/0223864 A1 * | 7/2021 | Forsland | G06F 1/163 |
| 2023/0308798 A1 * | 9/2023 | Zhang | H04R 5/0335 |

FOREIGN PATENT DOCUMENTS

WO  WO-2017146671 A1 *  8/2017  ............... H04R 1/10

\* cited by examiner

*Primary Examiner* — Oyesola C Ojo
(74) *Attorney, Agent, or Firm* — JCIPRNET (57) ABSTRACT

A headset device and a control method thereof are provided. The headset device includes a head beam, a headset, a sensing circuit, a determination circuit, and a microcontroller. The headset is joined to an end portion of the head beam. The sensing circuit is disposed at the head beam. The sensing circuit provides a sensing value corresponding to a stretch change of the head beam according to the stretch change of the head beam. The determination circuit compares the sensing value with a first reference value to generate a first determination signal and compares the sensing value with a second reference value to generate a second determination signal. The microcontroller controls the headset to enter one of a turned-on state and a turned-off state according to the first determination signal and the second determination signal.

18 Claims, 6 Drawing Sheets

HEADSET DEVICE AND CONTROL METHOD THEREOF

BACKGROUND

Technical Field

The disclosure relates to a headset device and a control method thereof. In particular, the disclosure relates to a headset device having a function of sensing a stretch change of a head beam and a control method thereof.

Description of Related Art

Headset devices currently on the market utilize infrared (IR) proximity sensors or capacitive sensors for wearing detection on the headset devices. The IR proximity sensor may perform wearing detection on the headset device based on the distance between the ear and the IR proximity sensor. However, it is relatively difficult to assemble the IR proximity sensor to the headset device. A headset device with an IR proximity sensor also has relatively high assembly cost.

The capacitive sensor performs wearing detection on the headset device by utilizing capacitance changes of wearing. However, when the headset device is in contact with metals, the capacitance change may be interfered with, which may cause erroneous determination that the headset device is worn. Therefore, the incorrect operation rate of the headset device is relatively high.

It can be seen that how to provide a headset device with low cost and improved determination accuracy in wearing detection is one of the research foci for those skilled in the related art.

SUMMARY

The disclosure is directed to a headset device and a control method thereof, providing the headset device with low cost and improved determination accuracy in wearing detection.

According to an embodiment of the disclosure, a headset device includes a head beam, a headset, a sensing circuit, a determination circuit, and a microcontroller. The headset is joined to an end portion of the head beam. The sensing circuit is disposed at the head beam. The sensing circuit is configured to provide a sensing value corresponding to a stretch change of the head beam according to the stretch change of the head beam. The determination circuit is coupled to the sensing circuit. The determination circuit is configured to compare the sensing value with a first reference value to generate a first determination signal and compare the sensing value with a second reference value to generate a second determination signal. The microcontroller is coupled to the determination circuit. The microcontroller is configured to control the headset to enter one of a turned-on state and a turned-off state according to the first determination signal and the second determination signal.

According to an embodiment of the disclosure, a control method of a headset device includes the following. The headset device includes a head beam, a headset, a sensing circuit, a determination circuit, and a microcontroller. The headset is joined to an end portion of the head beam. The control method includes the following. A sensing value corresponding to a stretch change of the head beam is provided by the sensing circuit according to the stretch change of the head beam. The sensing value is compared with a first reference value to generate a first determination signal and the sensing value is compared with a second reference value to generate a second determination signal by the determination circuit. The headset is controlled to enter one of a turned-on state and a turned-off state by the microcontroller according to the first determination signal and the second determination signal.

Based on the foregoing, the sensing circuit of the headset device provides the sensing value corresponding to the stretch change of the head beam according to the stretch change of the head beam. The headset device controls the status of the headset according to the sensing value corresponding to the stretch change of the head beam. The sensing circuit is disposed at the head beam. The difficulty in assembling the sensing circuit is relatively low. In this way, the assembly cost of the headset device is also relatively low. In addition, the headset device controls the status of the headset according to the sensing value corresponding to the stretch change of the head beam. Incorrect operation may not be caused by the sensing value interfered with by external metals or electrodes. In this way, the headset device can have high determination accuracy.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Reference will now be made in detail to exemplary embodiments of the disclosure, examples of which are illustrated in the accompanying drawings. Wherever possible, the same reference numerals are used in the drawings and descriptions to refer to the same or like parts.

Figure 1:
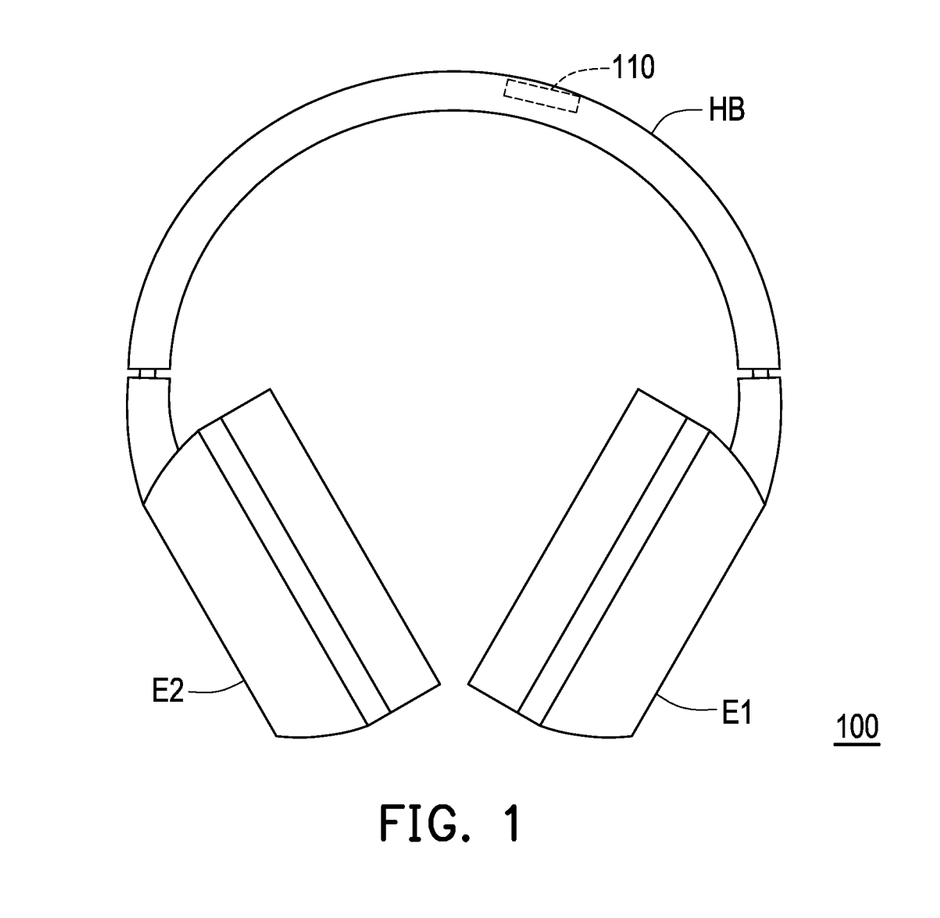
FIG. 1 is a schematic diagram of a headset device according to an embodiment of the disclosure.
Figure 2:
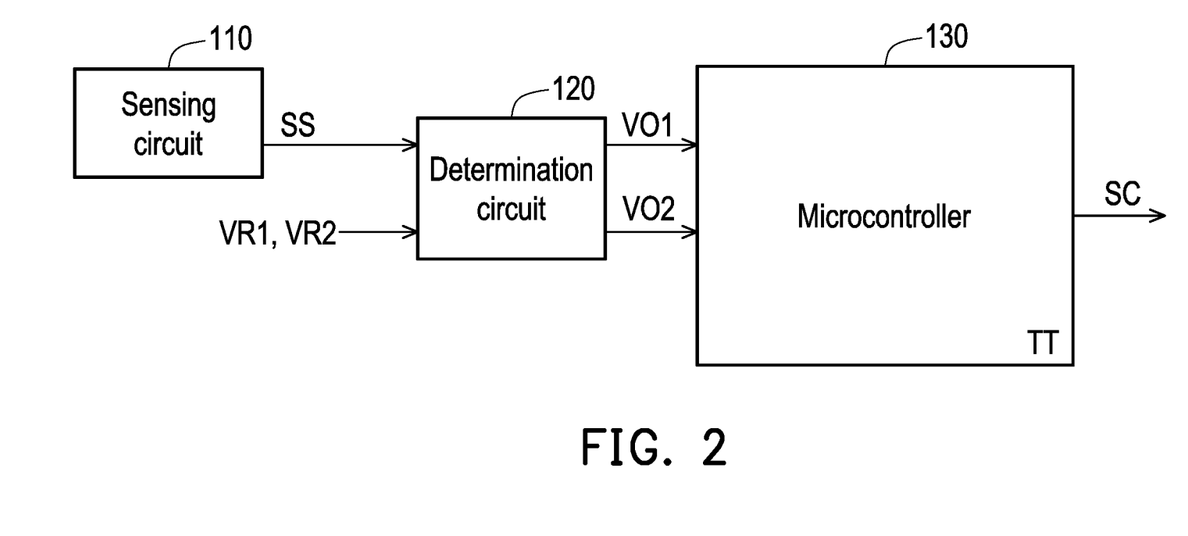
FIG. 2 is a schematic configuration diagram of a sensing circuit, a determination circuit, and a microcontroller according to an embodiment of the disclosure.

With reference to FIG. 1 and FIG. 2 together, FIG. 1 is a schematic diagram of a headset device according to an embodiment of the disclosure; FIG. 2 is a schematic configuration diagram of a sensing circuit, a determination circuit, and a microcontroller according to an embodiment of the disclosure. In this embodiment, a headset device 100 includes a head beam HB, headsets E1 and E2, a sensing circuit 110, a determination circuit 120, and a microcontroller 130. The headsets E1 and E2 are joined to end portions of the head beam HB. Taking this embodiment as an example, the headset E1 is joined to one of the two end portions of the head beam HB, and the headset E2 is joined to the other of the two end portions of the head beam HB. Two over-ear headsets are taken as an example in this embodiment. Nonetheless, the embodiment is not limited to the form or number of the headsets of this embodiment. In some embodiments, the headset device 100 includes one single headset.

The determination circuit 120 and the microcontroller 130 are disposed at one of the head beam HB and the headsets E1 and E2. In this embodiment, the sensing circuit 110 is disposed at the head beam HB. The sensing circuit 110 provides a sensing value SS corresponding to a stretch change of the head beam HB according to the stretch change of the head beam HB. In other words, the sensing circuit 110 may provide different sensing values SS based on different stretch changes of the head beam HB.

For example, when the head beam HB is stretched, the sensing circuit 110 provides a first sensing value among the sensing values SS. When the head beam HB is collapsed, the sensing circuit provides a second sensing value among the sensing values SS.

The determination circuit 120 is coupled to the sensing circuit 110. The determination circuit 120 receives the sensing value SS from the sensing circuit 110. The determination circuit 120 receives a first reference value VR1 and a second reference value VR2. The determination circuit 120 compares the sensing value SS with the first reference value VR1 to generate a first determination signal VO1. The determination circuit 120 compares the sensing value SS with the second reference value VR2 to generate a second determination signal VO2.

In this embodiment, the microcontroller 130 is coupled to the determination circuit 120. The microcontroller 130 receives the first determination signal VO1 and the second determination signal VO2 from the determination circuit 120. The microcontroller 130 controls the headsets E1 and E2 to enter one of a turned-on state and a turned-off state according to the first determination signal VO1 and the second determination signal VO2. The microcontroller 130 provides a control signal SC to control the headsets E1 and E2 to enter one of the turned-on state and the turned-off state according to the first determination signal VO1 and the second determination signal VO2.

For example, the microcontroller 130 controls the headsets E1 and E2 to enter the turned-on state according to the first determination signal VO1. For another example, the microcontroller 130 times a duration of the second sensing value VO2. The microcontroller 130 controls the headsets E1 and E2 to enter the turned-off state when the duration reaches a set time TT.

It is worth mentioning here that the sensing circuit 110 of the headset device 100 provides the sensing value SS corresponding to the stretch change of the head beam HB according to the stretch change of the head beam HB. The headset device 100 controls the states of the headsets E1 and E2 according to the sensing value SS corresponding to the stretch change of the head beam HB. The sensing circuit 110 is disposed at the head beam HB. The difficulty in assembling the sensing circuit 110 is relatively low. In this way, the assembly cost of the headset device 100 is also relatively low. In addition, the headset device 100 controls the states of the headsets E1 and E2 according to the sensing value SS corresponding to the stretch change of the head beam HB. Incorrect operation may not be caused by the sensing value SS interfered with by external metals or electrodes. In this way, the headset device 100 can have high determination accuracy.

Figure 3:
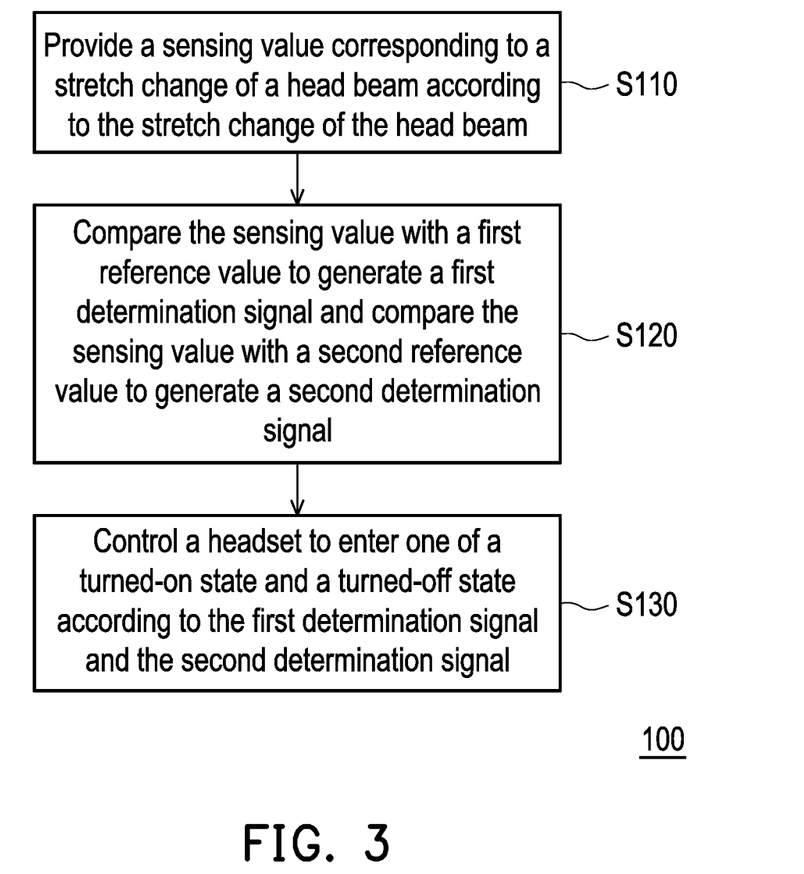
FIG. 3 is a flowchart of a control method according to an embodiment of the disclosure.

With reference to FIG. 1, FIG. 2, and FIG. 3 together, FIG. 3 is a flowchart of a control method according to an embodiment of the disclosure. In this embodiment, a control method S100 is adapted to the headset device 100. The control method S100 includes steps S110 to S130. In step S110, the sensing circuit 110 provides the sensing value SS corresponding to a stretch change of the head beam HB according to the stretch change of the head beam HB. In step S120, the determination circuit 120 compares the sensing value SS with the first reference value VR1 to generate the first determination signal VO1 and compares the sensing value SS with the second reference value VR2 to generate the second determination signal VO2. In step S130, the microcontroller 130 controls the headsets E1 and E2 to enter one of a turned-on state and a turned-off state according to the first determination signal VO1 and the second determination signal VO2. The implementation of steps S110 to S130 has been clearly described in the embodiments of FIG. 1 and FIG. 2, and will thus not be repeatedly described here.

Figure 4:
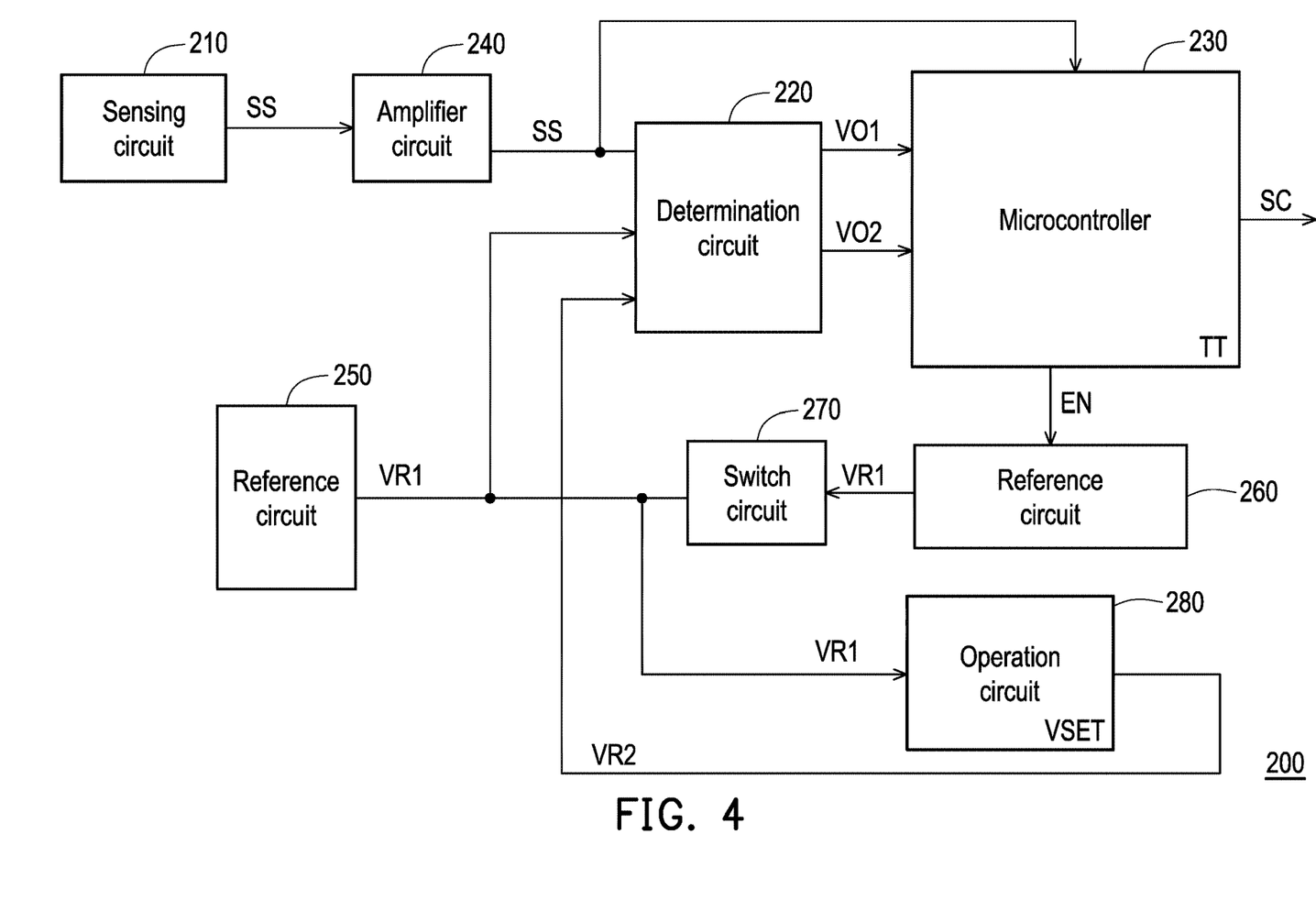
FIG. 4 is a schematic circuit configuration diagram of a headset device according to another embodiment of the disclosure.

With reference to FIG. 1 and FIG. 4 together, FIG. 4 is a schematic circuit configuration diagram of a headset device according to another embodiment of the disclosure. In this embodiment, a headset device 200 includes a head beam HB, headsets E1 and E2, a sensing circuit 210, a determination circuit 220, a microcontroller 230, and an amplifier circuit 240. The headsets E1 and E2 are joined to the end portion of the head beam HB. The sensing circuit 210 is disposed at the head beam HB. The sensing circuit 210 provides the sensing value SS corresponding to a stretch change of the head beam HB according to the stretch change of the head beam HB. The amplifier circuit 240 is coupled to the sensing circuit 210 and the determination circuit 220. The amplifier circuit 240 provides a gain for the sensing value SS. The determination circuit 220 receives the sensing value SS provided with a gain. The determination circuit 220 compares the sensing value SS with the first reference value VR1 to generate the first determination signal VO1 and compares the sensing value SS with the second reference value VR2 to generate the second determination signal VO2. The microcontroller 230 controls the headsets E1 and E2 to enter one of a turned-on state and a turned-off state according to the first determination signal VO1 and the second determination signal VO2.

In this embodiment, the microcontroller 230 may enter a sleep state after controlling the headsets E1 and E2 to enter one of the turned-on state and the turned-off state. In addition, the microcontroller 230 is triggered and woken up according to one of a level change of the first determination signal VO1 and a level change of the second determination signal VO2. It is worth mentioning here that the microcontroller 230 is woken up when one of the level of the first determination signal VO1 and the level of the second determination signal VO2 changes.

For example, when the level of the first determination signal VO1 is raised from a low voltage level to a high voltage level, the microcontroller 230 is woken up to control the headsets E1 and E2 to enter the turned-on state. In other words, the microcontroller 230 is woken up to control the headsets E1 and E2 to enter the turned-on state in response to a rising edge of the first determination signal VO1.

When the level of the second determination signal VO2 is raised from a low voltage level to a high voltage level, the microcontroller 230 is woken up to time a duration of the second determination signal VO2 being at a high voltage level. In other words, the microcontroller 230 is woken up to time a duration of the second determination signal VO2 being at a high voltage level in response to a rising edge of the second determination signal VO2. The microcontroller 230 controls the headsets E1 and E2 to enter the turned-off state when the duration reaches a set time. In some embodiments, the microcontroller 230 may perform timing according to a duration of the sensing value SS output by the amplifier circuit 240 being at a low voltage level, and the microcontroller 230 controls the headsets E1 and E2 to enter the turned-off state when the duration reaches a set time.

The microcontroller 230 may sleep after controlling the headsets E1 and E2. Low power consumption when the headset device 200 is worn can be ensured by intermittent sleep.

In this embodiment, the headset device 200 further includes reference circuits 250 and 260 and a switch circuit 270. The reference circuit 250 is coupled to the determination circuit 220. The reference circuit 250 provides the first reference value VR1 in the turned-off state, and stops providing the first reference value VR1 in the turned-on state. The reference circuit 260 is coupled to the microcontroller 230. The reference circuit 260 provides the first reference value VR1 in the turned-on state. The switch circuit 270 connects the reference circuit 260 to the determination circuit 220 during a period where the reference circuit 250 stops providing the first reference value VR1. The switch circuit 270 disconnects a connection between the reference circuit 260 and the determination circuit 220 during a period where the reference circuit 250 provides of the first reference value VR1.

The reference circuit 250 provides the first reference value VR1 when the headsets E1 and E2 are in the turned-off state. The reference circuit 260 provides the first reference value VR1 when the headsets E1 and E2 are in the turned-on state.

In this embodiment, the headset device 200 further includes an operation circuit 280. The operation circuit 280 is coupled to the determination circuit 220. The operation circuit 280 generates the second reference value VR2 according to the first reference value VR1 and a set value VSET, and provides the second reference value VR2 to the determination circuit 220. It is worth mentioning here that the operation circuit 280 generates the second reference value VR2 according to the first reference value VR1 and the set value VSET. As a result, independent circuits for generating the second reference value VR2 may be omitted. As a result, the cost of circuits of the headset device 200 may be reduced. In this embodiment, the operation circuit 280 may be a subtractor circuit (and the disclosure is not limited thereto). For example, the operation circuit 280 subtracts the voltage value of the set value VSET from the voltage value of the first reference value VR1 to generate the second reference value VR2.

Figure 5:
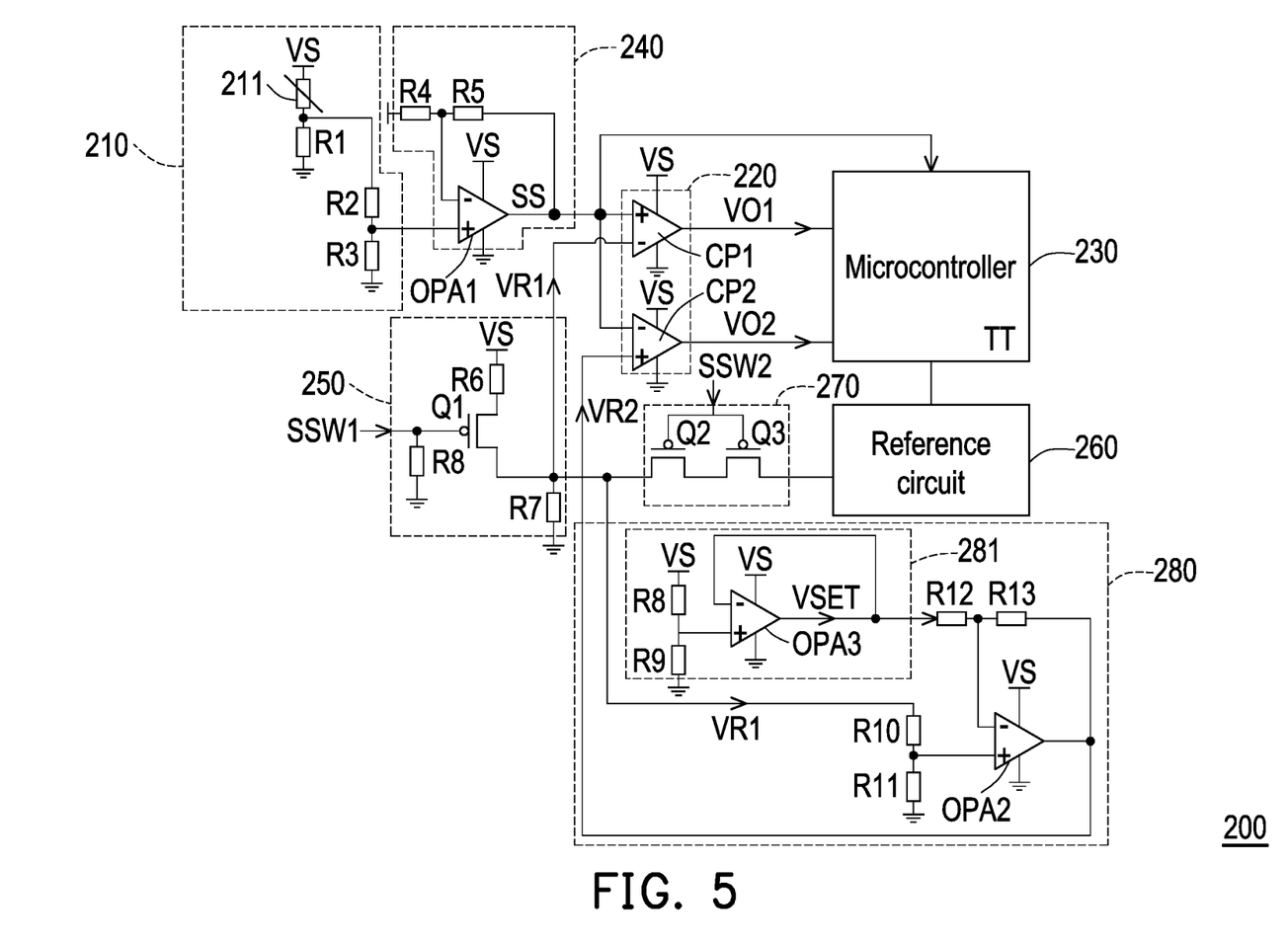
FIG. 5 is a circuit diagram of a headset device according to the headset device shown in FIG. 4.

With reference to FIG. 1, FIG. 4, and FIG. 5 together, FIG. 5 is a circuit diagram of a headset device according to the headset device shown in FIG. 4. In this embodiment, the sensing circuit 210 includes a force-resistance sensor 211. The distance between the two ends of the head beam HB is negatively correlated with a resistance value of the force-resistance sensor 211. The force-resistance sensor 211 provides a first resistance value when the head beam HB is stretched. The force-resistance sensor 211 provides a second resistance value when the head beam HB is collapsed. The second resistance value is greater than the first resistance value. The sensing circuit 210 provides a first sensing value according to the first resistance value and provides a second sensing value according to the second resistance value. In other words, the resistance value of the force-resistance sensor 211 may be negatively correlated with the sensing value SS. As a result, the magnitude of the distance between the two ends of the head beam HB is positively correlated with the sensing value SS.

Taking this embodiment as an example, the sensing circuit 210 also includes resistors R1 to R3. The force-resistance sensor 211 is coupled between a reference high voltage VS and the first terminal of the resistor R1. The second terminal of the resistor R1 is coupled to a reference low voltage (e.g., ground). The resistor R2 is coupled between the first terminal of the resistor R1 and the amplifier circuit 240. The resistor R2 is coupled between the amplifier circuit 240 and a reference low voltage. The sensing circuit 210 may utilize a voltage divided from the reference high voltage VS by the force-resistance sensor 211 and the resistors R1 to R3 to generate the sensing value SS. The second resistance value is greater than the first resistance value. As a result, the second sensing value is less than the first sensing value.

Taking this embodiment as an example, the amplifier circuit 240 includes an operational amplifier OPA1 and resistors R4 and R5. The non-inverting input terminal of the amplifier circuit 240 is coupled to the sensing circuit 210. The resistor R4 is coupled between the inverting input terminal of the amplifier circuit 240 and a reference low voltage. The resistor R5 is coupled between the inverting input terminal of the amplifier circuit 240 and the output terminal of the amplifier circuit 240. Taking this embodiment as an example, the amplifier circuit 240 may provide a gain for the voltage value of the sensing value SS according to the resistance values of the resistors R4 and R5.

In this embodiment, the determination circuit 220 includes comparators CP1 and CP2. The non-inverting input terminal of the comparator CP1 receives the sensing value SS. The inverting input terminal of the comparator CP1 receives the first reference value VR1. The output terminal of the comparator CP1 outputs the first determination signal VO1. The non-inverting input terminal of the comparator CP2 receives second reference value VR2. The inverting input terminal of the comparator CP2 receives the sensing value SS. The output terminal of the comparator CP2 outputs the second determination signal VO2.

The reference circuit 250 is coupled to the inverting input terminal of the comparator CP1. Taking this embodiment as an example, the reference circuit 250 includes a transistor Q1 and resistors R6 to R8. The first terminal of the resistor R6 receives a reference high voltage. The first terminal of the transistor Q1 is coupled to the second terminal of the first reference resistor. The second terminal of the transistor Q1 is coupled to the inverting input terminal of the comparator CP1. The control terminal of the transistor Q1 receives a switch signal SSW1. The resistor R7 is coupled between the second terminal of the transistor Q1 and a reference low voltage. The resistor R8 is coupled between the control terminal of the transistor Q1 and a reference low voltage.

The switch circuit 270 is coupled between the inverting input terminal of the comparator CP1 and the reference circuit 260. The switch circuit 270 includes transistors Q2 and Q3. The transistors Q2 and Q3 are coupled in series between the inverting input terminal of the comparator CP1 and the reference circuit 260. The first terminal of the transistor Q2 is coupled to the inverting input terminal of the comparator CP1. The second terminal of the transistor Q2 is coupled to the first terminal of the transistor Q3. The second terminal of the transistor Q3 is coupled to the reference circuit 260. The control terminal of the transistor Q2 and the control terminal of the transistor Q3 receive a switch signal SSW2.

In this embodiment, when the headsets E1 and E2 are in the turned-off state, the switch signal SSW1 has a low voltage level, and the switch signal SSW2 has a high voltage level. As a result, the transistor Q1 is turned on, and the transistors Q2 and Q3 are disconnected. The reference circuit 250 generates the first reference value VR1, and provides the first reference value VR1 to the inverting input terminal of the comparator CP1. The switch circuit 270 disconnects a connection between the reference circuit 260 and the inverting input terminal of the comparator CP1 during a period where the reference circuit 250 provides the first reference value VR1.

When the head beam HB is stretched, the force-resistance sensor 211 provides the first resistance value. The first determination signal VO1 output by the comparator CP1 has a rising edge. As a result, the microcontroller 230 is woken up. The woken-up microcontroller 230 controls the reference circuit 260 to provide the first reference value VR1. At this time, the switch signal SSW1 has a high voltage level, and the switch signal SSW2 has a low voltage level. As a result, the transistor Q1 is disconnected, and the transistors Q2 and Q3 are turned on. The reference circuit 250 stops providing the first reference value VR1. The switch circuit 270 connects the reference circuit 260 to the inverting input terminal of the comparator CP1 during a period where the reference circuit 250 stops providing the first reference value VR1.

In this embodiment, the operation circuit 280 is coupled between the inverting input terminal of the comparator CP1 and the non-inverting input terminal of the comparator CP2. The operation circuit 280 generates the second reference value VR2 according to the first reference value VR1 and the set value VSET, and provides the second reference value VR2 to the non-inverting input terminal of the comparator CP2.

Taking this embodiment as an example, the operation circuit 280 includes a set value generator 281 and an operational amplifier OPA2. The set value generator 281 provides the set value VSET. The operational amplifier OPA2 is coupled to the set value generator 281 and the non-inverting input terminal of the comparator CP2. The operational amplifier OPA2 receives the first reference value VR1 and the set value VSET, and generates the second reference value VR2 according to the first reference value VR1 and the set value VSET.

The set value generator 281 includes an operational amplifier OPA3 and resistors R8 and R9. The resistor R8 is coupled between the reference high voltage VS and the non-inverting input terminal of the operational amplifier OPA3. The resistor R9 is coupled between the non-inverting input terminal of the operational amplifier OPA3 and a reference low voltage. The inverting input terminal of the operational amplifier OPA3 is coupled to the output terminal of the operational amplifier OPA3. The set value generator 281 may divide the voltage value of the reference high voltage VS to provide the set value VSET according to the resistance values of the resistors R8 and R9. The set value VSET is a voltage value.

The operation circuit 280 also includes resistors R10 to R13. The resistor R10 is coupled between the inverting input terminal of the comparator CP1 and the non-inverting input terminal of the operational amplifier OPA3. The resistor R11 is coupled between the non-inverting input terminal of the operational amplifier OPA3 and a reference low voltage. The resistor R12 is coupled between the inverting input terminal of the operational amplifier OPA3 and the set value generator 281. The resistor R13 is coupled between the inverting input terminal of the operational amplifier OPA3 and the output terminal of the operational amplifier OPA3. Taking this embodiment as an example, the resistors R10 to R13 may have substantially the same resistance value. The operational amplifier OPA2 and the resistors R10 to R13 may form a subtractor circuit. As a result, the operation circuit 280 subtracts the set value VSET from the first reference value VR1 to generate the second reference value VR2. In other words, the second reference value VR2 is a voltage difference generated by subtracting the set value VSET from the voltage value of the first reference value VR1. The second reference value VR2 is less than the first reference value VR1.

Figure 6:
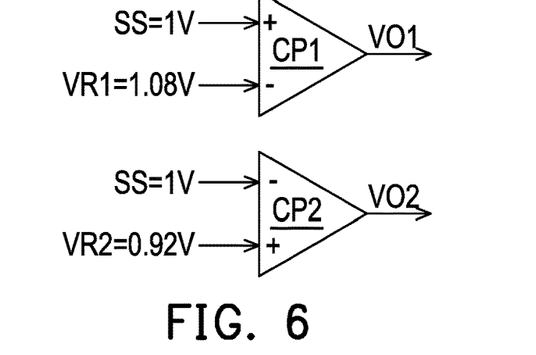
FIG. 6 is a schematic diagram of a first operation of a determination circuit according to an embodiment of the disclosure.

Next, the operation of the headset device 200 will be described with an example. First, with reference to FIG. 1, FIG. 5, and FIG. 6 together, FIG. 6 is a schematic diagram of a first operation of a determination circuit according to an embodiment of the disclosure. In this embodiment, the reference circuit 260 provides the first reference value VR1 when the headset device 200 is worn. The first reference value VR1 is, for example, 1.08 volts (V). The set value VSET is, for example, 0.16V. As a result, the second reference value VR2 is, for example, 0.92V (i.e., 1.08−0.16=0.92). When the headset device 200 is worn, the sensing value SS is, for example, 1V. The sensing value SS is less than the first reference value VR1. As a result, the first determination signal VO1 output by the comparator CP1 has a low voltage level. The sensing value SS is greater than the second reference value VR2. As a result, the second determination signal VO2 output by the comparator CP2 also has a low voltage level. When the headset device 200 is worn, the microcontroller 230 enter a continuous sleep state according to the first determination signal VO1 and the second determination signal VO2 having low voltage levels.

Figure 7:
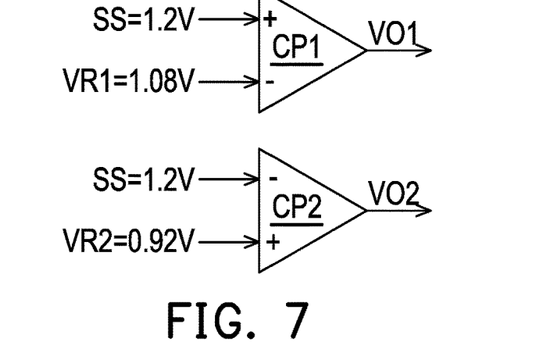
FIG. 7 is a schematic diagram of a second operation of a determination circuit according to an embodiment of the disclosure.

With reference to FIG. 1, FIG. 5, and FIG. 7 together, FIG. 7 is a schematic diagram of a second operation of a determination circuit according to an embodiment of the disclosure. When the head beam HB is stretched when being worn, the resistance value of the force-resistance sensor 211 is reduced. As a result, the sensing value SS rises from 1V to, for example, 1.2V. The sensing value SS is greater than the first reference value VR1. As a result, the first determination signal VO1 output by the comparator CP1 rises from a low voltage level to a high voltage level. When the head beam HB is stretched when being worn, the first determination signal VO1 has a rising edge. The sensing value SS is greater than the second reference value VR2. As a result, the second determination signal VO2 output by the comparator CP2 also has a low voltage level. The microcontroller 230 is woken up and recognizes that the head beam HB is stretched according to the rising edge of the first determination signal VO1.

Figure 8:
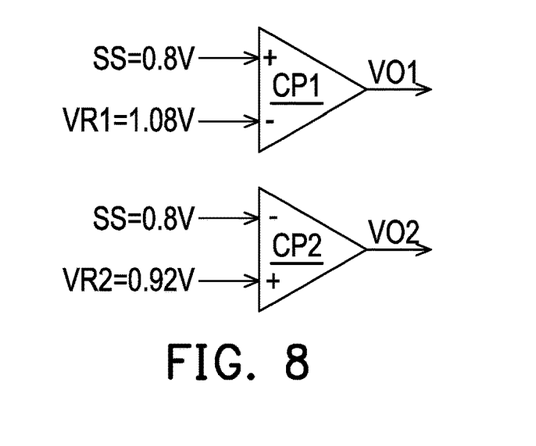
FIG. 8 is a schematic diagram of a third operation of a determination circuit according to an embodiment of the disclosure.

With reference to FIG. 1, FIG. 5, and FIG. 8 together, FIG. 8 is a schematic diagram of a third operation of a determination circuit according to an embodiment of the disclosure. When the head beam HB is collapsed (e.g., the headset device 200 is taken off), the resistance value of the force-resistance sensor 211 is increased. As a result, the sensing value SS drops to, for example, 0.8V. The sensing value SS is less than the first reference value VR1. As a result, the first determination signal VO1 output by the comparator CP1 has a low voltage level. The sensing value SS is less than the second reference value VR2. As a result, the second determination signal VO2 output by the comparator CP2 rises from a low voltage level to a high voltage level. When head beam HB is collapsed. The second determination signal VO2 has a rising edge. The microcontroller 230 is woken up and recognizes that the head beam HB is collapsed according to the rising edge of the second determination signal VO2.

In summary of the foregoing, the sensing circuit of the headset device is disposed at the head beam. The sensing circuit provides the sensing value corresponding to the stretch change of the head beam according to the stretch change of the head beam. The headset device controls the status of the headset according to the sensing value corresponding to the stretch change of the head beam. The sensing circuit is disposed at the head beam. The difficulty in assembling the sensing circuit is relatively low. In this way, the assembly cost of the headset device is also relatively low. In addition, the headset device controls the status of the headset according to the sensing value corresponding to the stretch change of the head beam. Incorrect operation may not be caused by the sensing value interfered with by external metals or electrodes. In this way, the headset device can have high determination accuracy. In addition, the microcontroller of the headset device is triggered and woken up according to one of the level change of the first determination signal and the level change of the second determination signal. The microcontroller may sleep after controlling the headset. As a result, low power consumption when the headset device is worn can be ensured by intermittent sleep.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A headset device comprising:
a head beam;
a headset joined to an end portion of the head beam;
a sensing circuit disposed at the head beam, and configured to provide a sensing value corresponding to a stretch change of the head beam according to the stretch change of the head beam;
a determination circuit coupled to the sensing circuit, and configured to compare the sensing value with a first reference value to generate a first determination signal and compare the sensing value with a second reference value to generate a second determination signal; and
a microcontroller coupled to the determination circuit, and configured to control the headset to enter one of a turned-on state and a turned-off state according to the first determination signal and the second determination signal,
wherein the microcontroller enters a sleep state after controlling the headset to enter one of the turned-on state and the turned-off state, and
wherein the microcontroller is triggered and woken up according to one of a level change of the first determination signal and a level change of the second determination signal.

2. The headset device according to claim 1, wherein the sensing circuit provides a first sensing value when the head beam is stretched,
the sensing circuit provides a second sensing value when the head beam is collapsed, and
the microcontroller controls the headset to enter the turned-on state according to the first determination signal.

3. The headset device according to claim 2, wherein
the microcontroller times a duration of the second sensing value, and
the microcontroller controls the headset to enter the turned-off state when the duration reaches a set time.

4. The headset device according to claim 2, wherein the sensing circuit comprises:
a force-resistance sensor configured to provide a first resistance value when the head beam is stretched and provide a second resistance value when the head beam is collapsed.

5. The headset device according to claim 4, wherein
the second resistance value is greater than the first resistance value,
the sensing circuit provides the first sensing value according to the first resistance value and provides the second sensing value according to the second resistance value, and
the second sensing value is less than the first sensing value.

6. The headset device according to claim 1, further comprising:
an amplifier circuit coupled to the sensing circuit and the determination circuit, and configured to provide a gain for the sensing value.

7. The headset device according to claim 1, wherein the determination circuit comprises:
a first comparator, wherein a non-inverting input terminal of the first comparator receives the sensing value, an inverting input terminal of the first comparator receives the first reference value, and an output terminal of the first comparator outputs the first determination signal; and
a second comparator, wherein a non-inverting input terminal of the second comparator receives the second reference value, an inverting input terminal of the second comparator receives the sensing value, and an output terminal of the second comparator outputs the second determination signal,
wherein the microcontroller is triggered and woken up according to one of a rising edge of the first determination signal and a rising edge of the second determination signal.

8. The headset device according to claim 1, wherein the microcontroller recognizes that the head beam is stretched according to a rising edge of the first determination signal, and recognizes the head beam is collapsed according to a rising edge of the second determination signal.

9. The headset device according to claim 7, further comprising:
a first reference circuit coupled to the inverting input terminal of the first comparator, and configured to provide the first reference value in the turned-off state and stop providing the first reference value in the turned-on state;
a second reference circuit coupled to the microcontroller, and configured to provide the first reference value in the turned-on state; and
a switch circuit configured to connect the second reference circuit to the inverting input terminal of the first comparator during a period where the first reference circuit stops providing the first reference value and disconnect a connection between the second reference circuit and the inverting input terminal of the first comparator during a period where the first reference circuit provides the first reference value.

10. The headset device according to claim 9, wherein the first reference circuit provides the first reference value when the headset is in the turned-off state.

11. The headset device according to claim 7, further comprising:
an operation circuit coupled between the inverting input terminal of the first comparator and the non-inverting input terminal of the second comparator, configured to generate the second reference value according to the first reference value and a set value, and providing the second reference value to the non-inverting input terminal of the second comparator.

12. The headset device according to claim 11, wherein the operation circuit comprises:
a set value generator configured to provide the set value; and
an operational amplifier coupled to the set value generator and the non-inverting input terminal of the second comparator, and configured to generate the second reference value according to the first reference value and the set value.

13. A control method of a headset device, wherein the headset device comprises a head beam, a headset, a sensing circuit, a determination circuit, and a microcontroller, and the headset is joined to an end portion of the head beam, wherein the control method comprises:
providing a sensing value corresponding to a stretch change of the head beam by the sensing circuit according to the stretch change of the head beam;
comparing the sensing value with a first reference value to generate a first determination signal and comparing the sensing value with a second reference value to generate a second determination signal by the determination circuit;
controlling the headset to enter one of a turned-on state and a turned-off state by the microcontroller according to the first determination signal and the second determination signal;
making the microcontroller enter a sleep state after controlling the headset to enter one of the turned-on state and the turned-off state, and
triggering the microcontroller to wake up the microcontroller according to one of a level change of the first determination signal and a level change of the second determination signal.

14. The control method according to claim 13, wherein providing the sensing value corresponding to the stretch change of the head beam by the sensing circuit according to the stretch change of the head beam comprises:
providing a first sensing value when the head beam is stretched; and
providing a second sensing value when the head beam is collapsed.

15. The control method according to claim 14, wherein providing the sensing value corresponding to the stretch change of the head beam by the sensing circuit according to the stretch change of the head beam comprises:
providing a first resistance value when the head beam is stretched;
providing a second resistance value when the head beam is collapsed, wherein the second resistance value is greater than the first resistance value; and
providing the first sensing value according to the first resistance value and providing the second sensing value according to the second resistance value by the sensing circuit, wherein the second sensing value is less than the first sensing value.

16. The control method according to claim 14, further comprising:
timing a duration of the second sensing value by the microcontroller, and
controlling the headset to enter the turned-off state by the microcontroller when the duration reaches a set time.

17. The control method according to claim 13, wherein the determination circuit comprises a first comparator and a second comparator, wherein a non-inverting input terminal of the first comparator receives the sensing value, an inverting input terminal of the first comparator receives the first reference value, and an output terminal of the first comparator outputs the first determination signal, wherein a non-inverting input terminal of the second comparator receives the second reference value, an inverting input terminal of the second comparator receives the sensing value, and an output terminal of the second comparator outputs the second determination signal, wherein triggering the microcontroller according to one of the level change of the first determination signal and the level change of the second determination signal comprises:
triggering the microcontroller according to one of a rising edge of the first determination signal and a rising edge of the second determination signal.

18. The control method according to claim 13, further comprising:
generating the second reference value according to the first reference value and a set value.

* * * * *